(12) United States Patent
Davies-Barrett et al.

(10) Patent No.: US 11,757,743 B1
(45) Date of Patent: Sep. 12, 2023

(54) LOW-CODE/NO-CODE MACHINE LEARNING DATA STREAM ANALYSIS SYSTEM

(71) Applicant: Microsoft Technology Licensing, LLC, Redmond, WA (US)

(72) Inventors: Karl Davies-Barrett, Munich (DE); Robert John Starling, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/710,302

(22) Filed: Mar. 31, 2022

(51) Int. Cl.
*H04L 43/08* (2022.01)
*H04L 41/16* (2022.01)
*H04L 65/61* (2022.01)
*H04L 41/0803* (2022.01)
*H04W 76/10* (2018.01)

(52) U.S. Cl.
CPC .......... *H04L 43/08* (2013.01); *H04L 41/0803* (2013.01); *H04L 41/16* (2013.01); *H04L 65/61* (2022.05); *H04W 76/10* (2018.02)

(58) Field of Classification Search
CPC ..... H04L 43/08; H04L 41/0803; H04L 41/16; H06W 76/10
See application file for complete search history.

(56) References Cited

U.S. PATENT DOCUMENTS

| | | | |
|---|---|---|---|
| 11,429,813 B1* | 8/2022 | Aghoram Ravichandran | G06V 10/75 |
| 2021/0117859 A1* | 4/2021 | Rogers | G06N 3/063 |
| 2021/0397544 A1* | 12/2021 | Liu | G06F 11/3692 |
| 2022/0294715 A1* | 9/2022 | Agrawal | H04L 41/142 |

* cited by examiner

*Primary Examiner* — Viet D Vu
(74) *Attorney, Agent, or Firm* — ArentFox Schiff LLP (57) ABSTRACT

The present application relates to developing and deploying machine learning analysis systems using a low-code or no-code approach. A cloud service is configured to receive a first data stream from a sensor device and train a machine-learning model to recognize selected elements of the first data stream that are selected from a package of template models via a graphical user interface. The cloud service deploys the machine-learning model to an edge datacenter configured to receive a second data stream via a network connection. The edge datacenter locally interrogates the second data stream based on the machine-learning model to generate an element set including the selected elements. A logic service may receive a selection of one or more properties of the element set and one or more logical operators via a graphical user interface to generate user-configured logical rules. The logic service may the user-configured logical rules to the element set.

17 Claims, 8 Drawing Sheets

LOW-CODE/NO-CODE MACHINE LEARNING DATA STREAM ANALYSIS SYSTEM

BACKGROUND

Machine learning (ML) is a class of computer algorithms that can improve automatically through experience and by the use of data. Generally, a machine learning algorithm uses a set of training data to develop a model that analyzes similar data. For example, a machine learning classifier is a type of model that may be trained on sets of labeled data to classify new data by applying a label. Machine learning offers a new paradigm for solving numerous real world problems. In particular, machine learning algorithms may be well suited to analyzing streams of data and extracting useful information.

Machine learning systems are conventionally designed by data scientists to analyze particular sets of data. Such systems may be the result of a long development process. For example, the development process may involve collection of training data, development of models, testing of models, and buildout of applications. Some potential use cases for machine learning; however, may be smaller scale or have short time restraints that make development of a new machine learning system infeasible or impractical. Accordingly, there is a need to improve development and deployment of machine learning systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, the disclosure provides a system for performing customized machine learning analysis of a data stream. The system includes a cloud service configured to: receive a first data stream from a sensor device; train a machine-learning model to recognize selected elements of the first data stream that are selected from a package of template models; and deploy the machine-learning model to an edge datacenter. The system includes an edge datacenter configured to: receive a second data stream via a network connection; and locally interrogate the second data stream based on the machine-learning model to generate an element set including the selected elements.

In another example, the disclosure provides a method of deploying customized machine learning analysis of a data stream. The method includes receiving a first data stream from a sensor device. The method includes training a machine-learning model to recognize selected elements of the first data stream that are selected from a package of template models via a graphical user interface. The method includes deploying the machine-learning model to an edge datacenter. The method includes receiving a second data stream at the edge datacenter via a network connection. The method includes interrogating the second data stream at the edge datacenter based on the machine-learning model to generate an element set including the selected elements.

In another example, the disclosure provides a non-transitory computer-readable medium storing computer executable instructions for deploying customized machine learning analysis of a data stream. The non-transitory computer-readable medium includes instructions to receive a first data stream from a sensor device. The non-transitory computer-readable medium includes instructions to train a machine-learning model to recognize selected elements of the first data stream that are selected from a package of template models via first user interface. The non-transitory computer-readable medium includes instructions to receive a selection of one or more properties of an element set and one or more logical operators via a graphical user interface to generate user-configured logical rules. The non-transitory computer-readable medium includes instructions to receive a second data stream via a network connection. The non-transitory computer-readable medium includes instructions to interrogate the second data stream based on the machine-learning model to generate the element set including the selected elements. The non-transitory computer-readable medium includes instructions to apply the user-configured logical rules to the element set.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to cloud based machine learning data stream analysis systems. In particular, the disclosure describes techniques for developing and deploying a cloud based machine learning data stream analysis system using a no-code or low-code approach. The techniques make use of model templates and graphical user input for training a custom model. For instance, model templates may include models trained to recognize sets of images in a data stream. The system may be configured with a library of model templates, and a user may select applicable model templates for creating a custom model. The custom model may be further trained based on additional training data and/or input from the user. For example, the user may provide a training data stream (e.g., a video stream) of objects that the machine learning system should recognize. The system may apply the selected model templates to the training data stream to generate suggested elements. The user may provide feedback identifying the suggested element. For example, the user may confirm the suggested element, provide a new label for the suggested element, or indicate that the suggested element is not of interest. Accordingly, the training data stream and feedback may provide a training data set for customizing the model templates with no coding or minimal coding by the user (e.g., labeling). Because the custom model may rely on the model structure provided by the model templates, the user does not need specific knowledge of modeling to develop the custom model.

The system also provides for deployment of the machine learning model using cloud resources such as edge services (e.g., at edge datacenters) and more general cloud services. In some implementations, a machine learning system may be deployed on cloud resources without the user owning specific hardware. In some implementations, processing by the machine learning system may be located close to the origin of the data stream. For example, the custom model may be deployed to an edge datacenter that is connected to a sensor device via a radio access network. In some implementations, the custom model may be deployed to the sensor device. In some implementations, one or more radio access network nodes or functions may be implemented at the edge datacenter. Accordingly, the data stream or a stream of identified elements may be transmitted to the edge datacenter with relatively low latency (e.g., compared to connectivity via an internet service provider (ISP) or mobile network).

Figure 5:
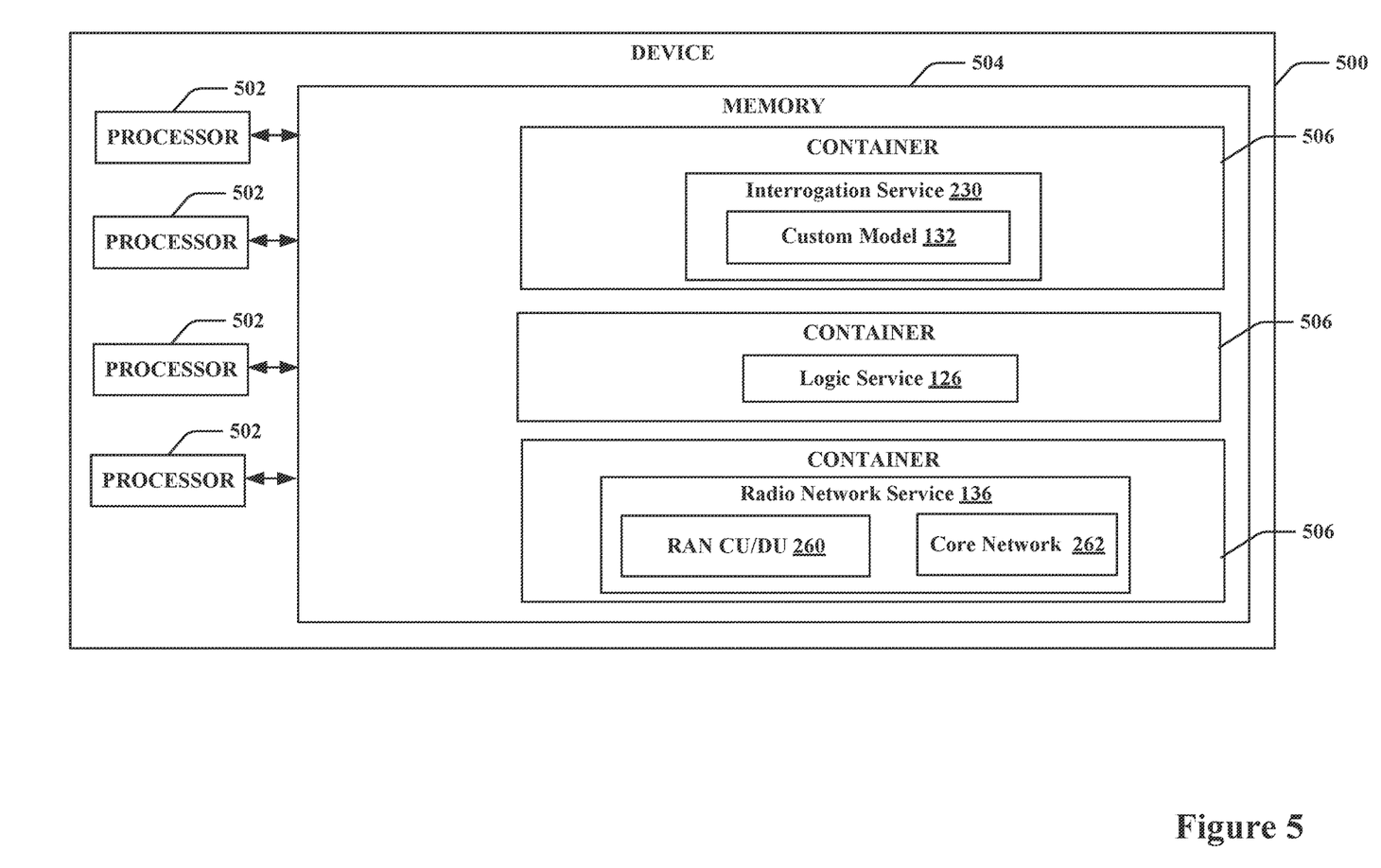
FIG. 5 is a schematic diagram of an example of an apparatus for providing edge services, in accordance with aspects described herein.
Figure 6:
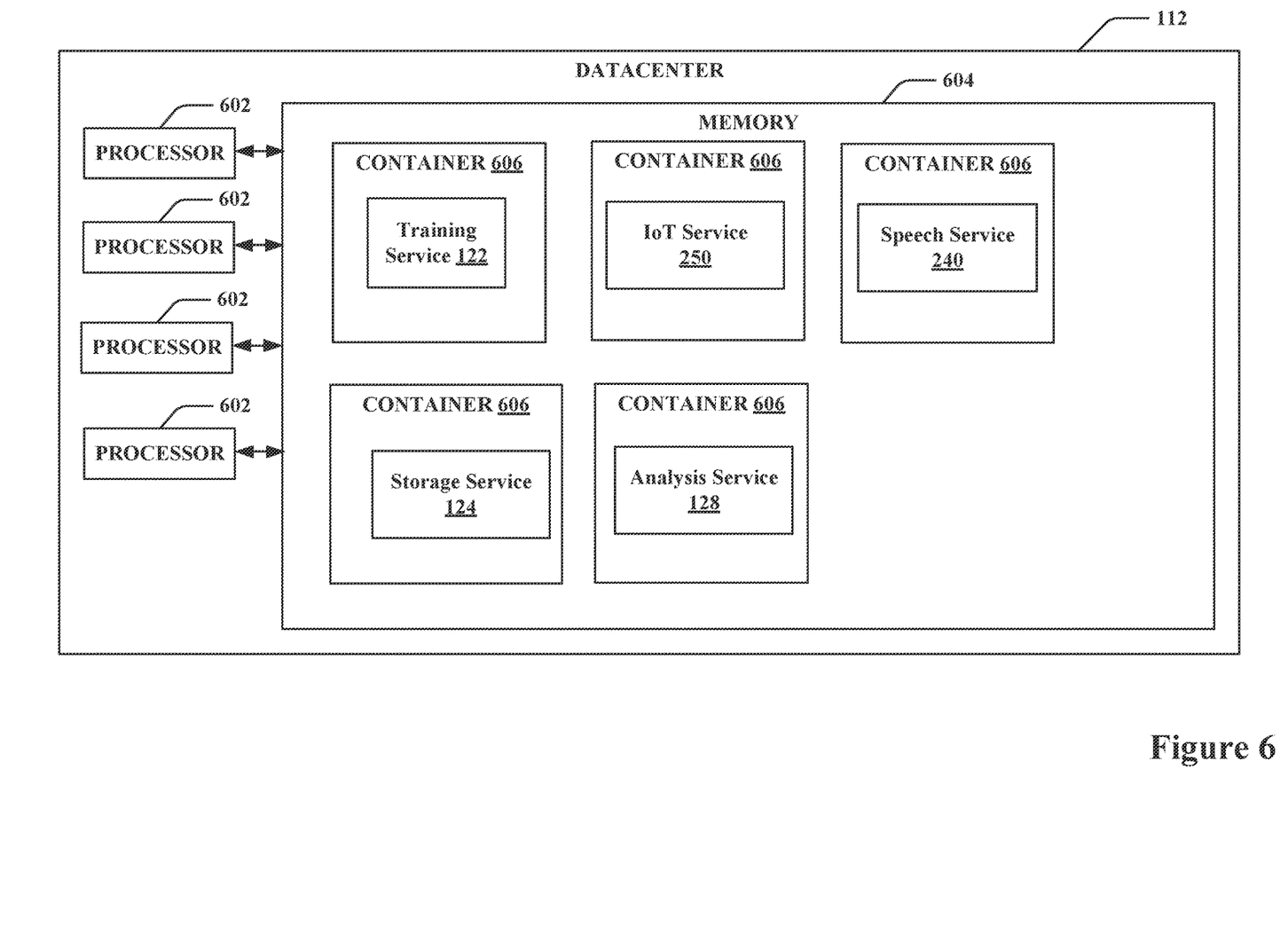
FIG. 6 is a schematic diagram of an example of a datacenter for hosting various cloud services, in accordance with aspects described herein.
Figure 7:
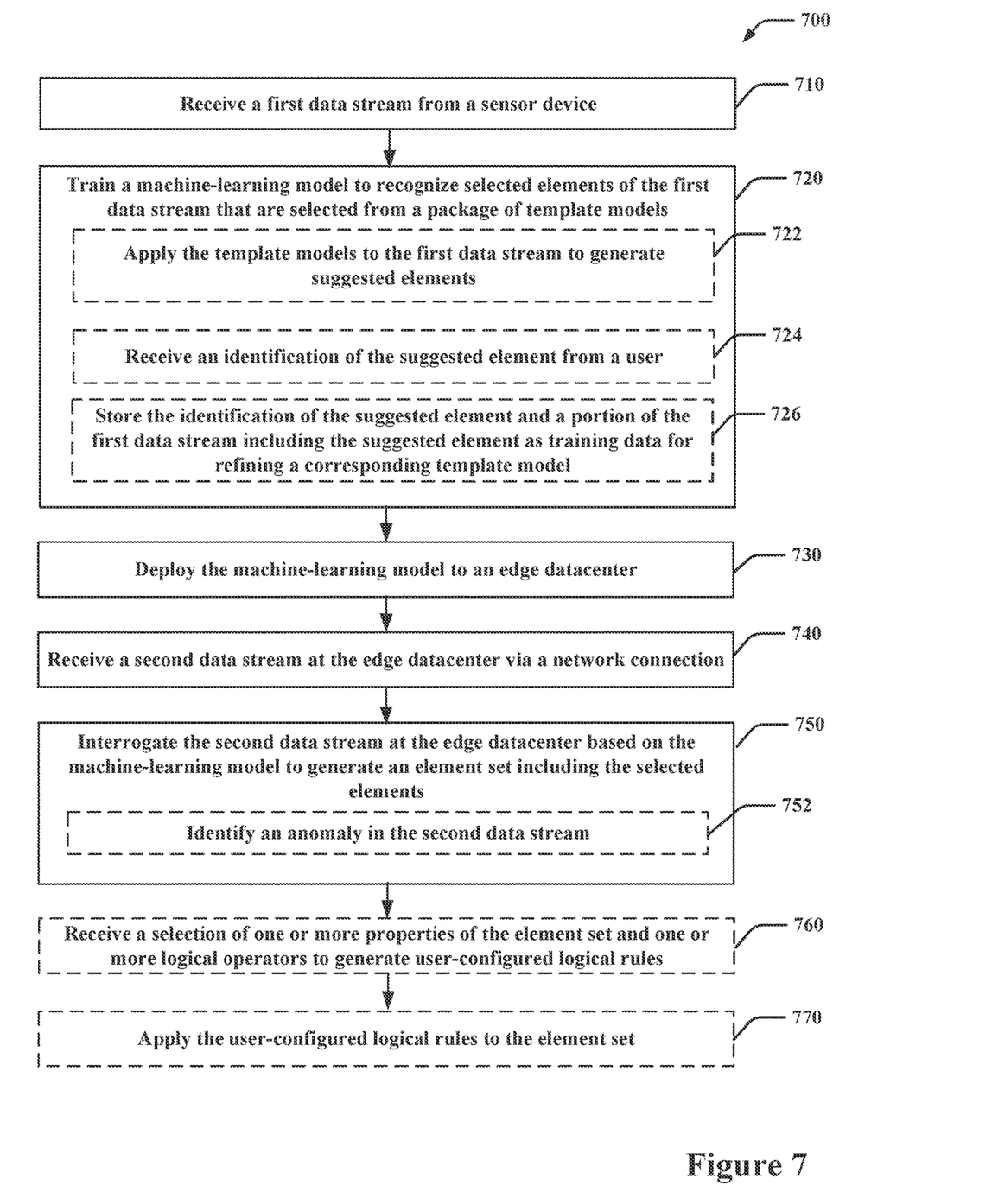
FIG. 7 is a flow diagram of an example of a method for deploying a machine-learning data stream analysis system, in accordance with aspects described herein.

Turning now to FIGS. 1-8, examples are depicted with reference to one or more components and one or more methods that may perform the actions or operations described herein, where components and/or actions/operations in dashed line may be optional. Although the operations described below in FIG. 7 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
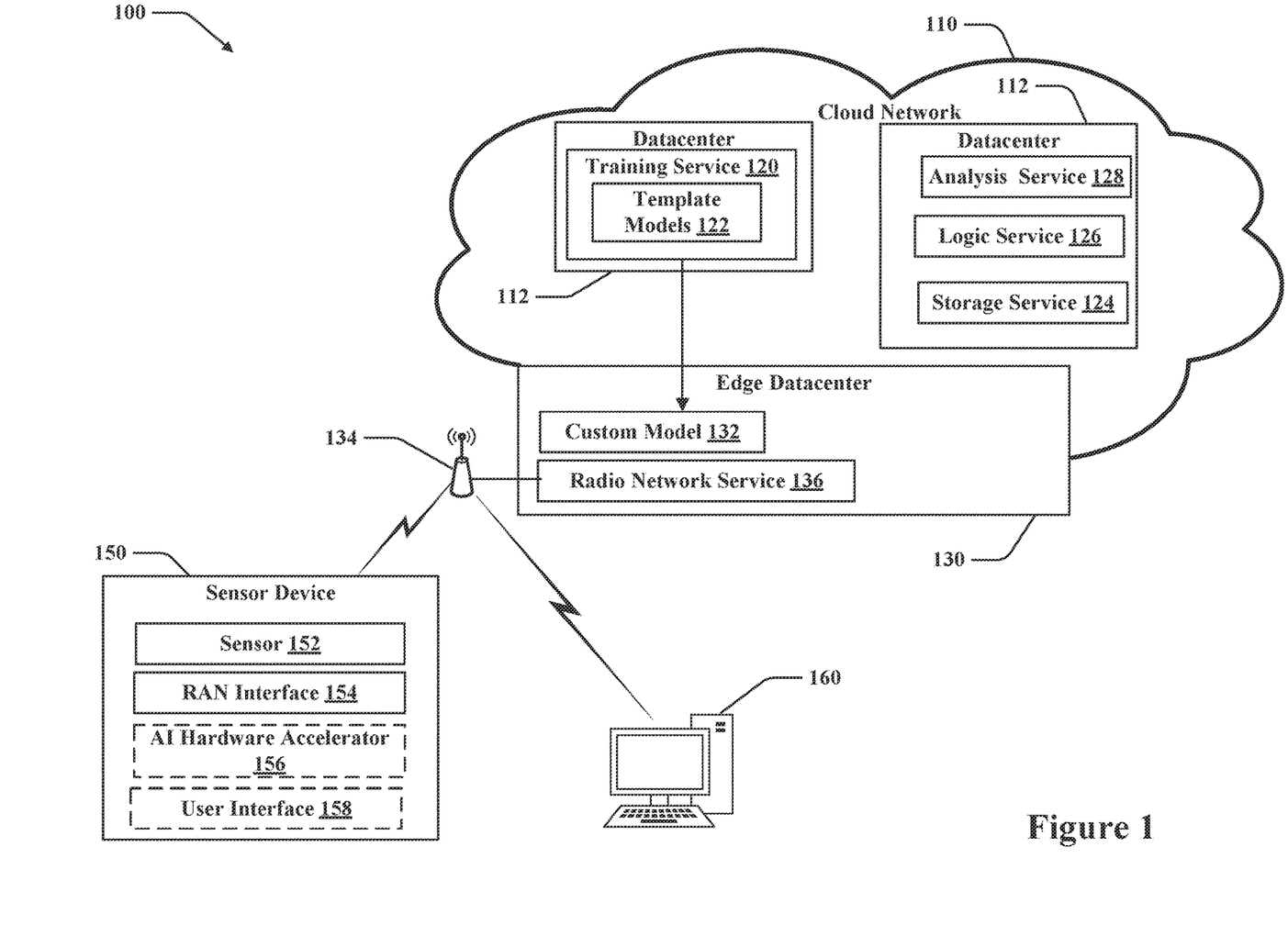
FIG. 1 is a diagram of an example of an architecture for a cloud based machine learning data stream analysis system, in accordance with aspects described herein.

FIG. 1 is a diagram of an example of an architecture for a cloud based machine learning data stream analysis system 100. The system 100 may include a cloud network 110, an edge datacenter 130, and a sensor device 150. The cloud network 110 may host one or more services such as a training service 140 configured to train a custom model. The edge datacenter 130 may be a datacenter at an edge of the cloud network 110 configured to host services such as an interrogation service for a custom model 132 and a radio network service 136. For example, the edge datacenter 130 may be selected such that the sensor device 150 is within a radio access network coverage area of an antenna connected to the edge datacenter 130. The sensor device 150 may be configured to generate a data stream for analysis. For example, the data stream may be a video stream or an audio stream.

The cloud network 110 may include computing resources that are controlled by a network operator and accessible to public clients. For example, a public client may be a user that owns or controls the sensor device 150 and acquires services from the cloud network 110. In some implementations, the user may access the cloud network 110 via a user device 160. The cloud network 110 may include a plurality of datacenters 112. Each datacenter 112 may host services. For example, the services may include a training service 120, a storage service 124, a logic service 126, and an analysis service 128. The datacenters 112 may, for example, host the services on virtual machines or containers on the computing resources such as servers located in the datacenter 112.

The training service 120 may be configured to train a custom machine-learning model. For instance, the training service 120 may be configured with a package of template models 122. The user may select relevant template models 122. The training service 120 may then further train the template models 122 based on a data stream and user input such as feedback regarding suggested elements. The training service 120 may store the custom model 132 and/or deploy the custom model at the edge datacenter 130. The storage service 124 may store information for the user such as the custom model 132 or an element set based on interrogation of a data stream. The logic service 126 may be configured to apply user configured logic rules to an element set based on interrogation of a data stream. The analysis service 128 may be configured to perform statistical analysis on an element set stored in storage service 124.

The edge datacenter 130 may be a datacenter located at an edge of the cloud network 110. An edge datacenter 130 may include a connection to another network. For example, an edge datacenter may be connected to other networks at a point of presence (POP), which may include routers that connect the edge datacenter to external networks such as internet service providers (ISPs). In some implementations, an edge datacenter 130 may be connected to an antenna 134, which may provide connectivity to other devices via a radio access network. The edge datacenter 130 may host a radio network service 136 that includes protocol stacks for one or more radio network nodes or functions. For example, the radio network service 136 may allow the edge datacenter 130 to act as a base station and/or core network of a radio access network (RAN).

The sensor device 150 may include one or more sensors 152 and a RAN interface 154. In some implementations, the sensor device 150 may include an AI hardware accelerator 156 configured to perform a machine learning process. For example, in some implementations, the custom model 132 may be deployed to the sensor device 150 and execute on the AI hardware accelerator 156. In some implementations, the sensor device 150 includes a user interface 158 that allows the user to interact with one or more of the services hosted by the cloud network 110. In some implementations, the user device 160 may provide a user interface 158.

Figure 2:
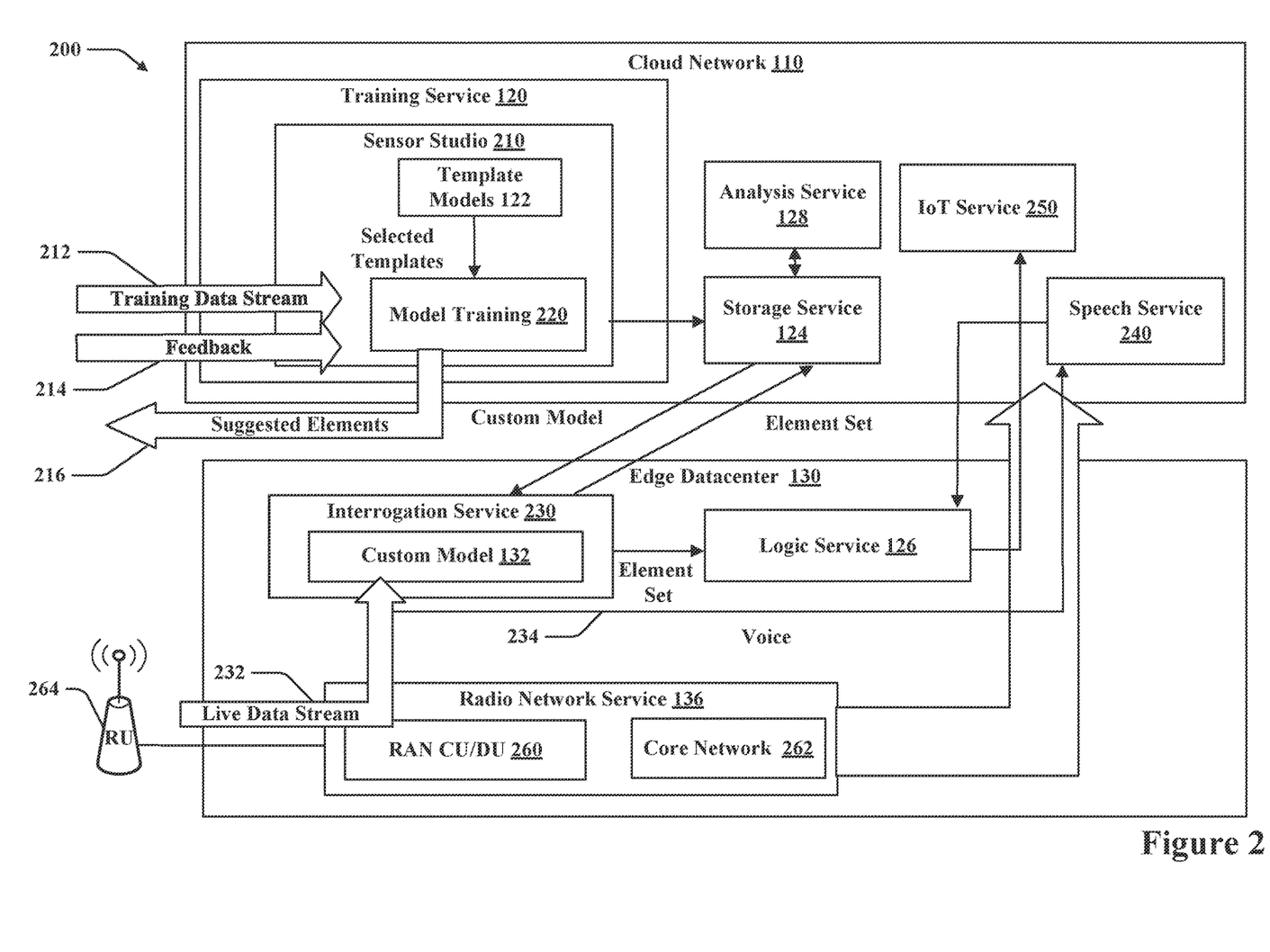
FIG. 2 is a diagram of an example of data flow between various components of a cloud based machine learning data stream analysis system, in accordance with aspects described herein.

FIG. 2 is a diagram 200 of an example of data and control flow between components of the system 100 including the cloud network 110 and the edge datacenter 130. Although various services are illustrated as being hosted at the cloud network 110 or the edge datacenter 130, it should be understood that a service may be hosted at a different location. For example, a service that is illustrated as hosted at the cloud network 110 may be hosted at the edge datacenter 130, for example, to improve latency with the sensor device 150 or user device 160.

The training service 120 may be hosted in the cloud network 110. The training service 120 may include a sensor studio 210 and model training 220. The sensor studio 210 may provide a user interface for training custom models. For example, the sensor studio 210 may include a graphical menu and/or search engine for selecting template models 122. For instance, a user may be able to navigate through categories or enter key words to find relevant models. The sensor studio 210 may provide the selected templates to the model training 220.

The model training 220 may receive the selected templates from the sensor studio 210. The model training 220 may receive a training data stream 212 from a user. In some implementations, the training data stream 212 may be received from the sensor device 150, but in other scenarios it may be beneficial to receive the training data stream 212 from a location different than the location where the model is to be deployed. The model training 220 may apply the selected templates to the training data stream 212 to identify suggested elements 216. The model training 220 may return the suggested elements 216 to the user, for example, by drawing a bounding box around an element of a video data stream and labeling the bounding box. The user may provide feedback 214 to identify the suggested element. For example, the user may identify the suggested element as correct, may provide a different label for the suggested element, or indicate that the suggested element 216 is not of interest. The training data stream and feedback 214 may provide a training set of labeled elements for further training of the template models 122. In some implementations, the model training 220 may continuously or periodically update the custom model during a training mode. The training mode may end, for example, based on a selection by the user or a condition such as satisfying a threshold level of accuracy. After training, the model training 220 may store the custom model 132 in a storage service 124.

The custom model 132 may be deployed to the edge datacenter 130. For example, the edge datacenter 130 may host an interrogation service 230 on a virtual machine or container. The interrogation service 230 may receive a live data stream 232. For example, the live data stream 232 may be an audio and/or video data stream generated by the sensor device 150. In some implementations, the live data stream 232 may be received via a RAN, where the edge datacenter 130 hosts the network service 136 to control the RAN. The interrogation service 230 may locally interrogate the live data stream 232 based on the custom model 132 to generate an element set. The element set may include selected elements corresponding to the selected template models 122. The interrogation service 230 may output the element set to one or more other services such as a logic service 126 or the storage service 124.

For example, the logic service 126 may be configured to apply user configured logical rules to the element set. For instance, the logic service 126 may be a serverless compute function or logic application. A logic application may be configured via a graphical user interface, for example, by a user selecting one or more properties of the element set and one or more logical operators to generate a user configured logical rule. For example, a user configured logical rule may compare a number of elements in the element set to a threshold and send a message when the threshold is satisfied. A serverless compute function may execute simple code, providing greater flexibility for user configured logical rules.

In some implementations, the storage service 124 may allow more complex analysis to be performed on the element set. For example, an analysis service 128 may analyze the element set collected over a period of time. In some implementations, the analysis service 128 may include its own machine learning algorithm configured to optimize a parameter identified by the element set.

In some implementations, the edge datacenter may receive another data stream. For instance, the live data stream 232 may include a voice data stream 234, or the voice data stream may be received from a different source. The voice data stream 234 may be used to control the logic service 126. For example, the edge datacenter 130 may provide the voice data stream 234 to a speech service 240, which may reside in the cloud network 110. The speech service may analyze the voice data stream 234 to detect commands. The speech service may provide the commands to the logic service 126. For example, the commands may be associated with a set of logic rules for the logic service 126 to evaluate in response to the commands. A user may use a graphical user interface to associate commands with the logic rules.

In some implementations, an IoT service 250 may control one or more devices. For example, an IoT service 250 may receive an action from the logic service 126. For instance, the IoT service 250 may play an alert over a smart speaker. The IoT service may provide a variety of actions that may be configured via the logic service 126.

The radio network service 136 may provide radio connectivity for the sensor device 150 and/or the user device 160. For example, the radio network service 136 may include a radio access network central unit (CU) and/or distributed unit (DU), which may perform functionality associated with a cellular base station. The RAN CU/DU 260 may execute a RAN protocol stack. For example, the RAN CU/DU 260 may operate as specified by the third generation partnership project (3GPP) 5G new radio (NR) specifications, or other standardized radio network specifications. The CAN CU/DU may communicate with a radio unit 264, which may include the antenna 134. Additionally, the radio network service 136 may include a core network 262, which may execute a cellular core network protocol stack. For instance, the core network 262 may handle provisioning of services and routing of internet protocol (IP) packets. In some implementations, because the radio network is provided by the cloud network 110 and/or edge datacenter 130, the RAN may be configured with security protocols or routing to reduce latency. For example, the core network 262 may route incoming packets for the live data stream 232 to the interrogation service 230 without traversing a public network such as the Internet. The core network 262 may also control routing to the cloud network 110.

An example use case for the machine learning analysis system 100 is a construction scenario, where tasks may be relatively short duration and the environment may change rapidly. For example, a construction task may require protective equipment to be worn in a particular area of a construction site. A custom model 132 may be trained for the particular area to identify people within the area and indicate whether the people are wearing the required protective equipment. For example, using the low-code/no-code approach, a user may select template models 122 of people and protective equipment. During a training phase, a first video feed including people both with and without protective equipment may be provided to the cloud infrastructure. Based on the package of model templates, the cloud infrastructure may identify the people and ask a user to label or confirm labels (e.g., wearing protective equipment or not). The custom model 132 may then be trained to generate identified elements such as a person within the particular area and a person not wearing protective equipment. The user may define logical rules to generate an alarm when a person not wearing protective equipment is detected in the particular area. For example, using a low-code/no-code approach, the user may select the person not wearing protective equipment element of the element set and associate that element with an action such as sending an alert to a foreman.

Another example use case is a response to a natural disaster or other emergency. In such a situation, there may be particular images or sounds that would be desirable to locate. For example, it may be desirable to identify flooded areas in aerial surveillance video or identify survivors amongst disaster conditions (e.g., flood waters or collapsed buildings). Using a low-code/no-code approach with the sensor studio 210, a user may select template models 122 for people or parts of people (e.g., head and arms visible in flood water). The machine learning model may be trained on video of an initial area that rescue crews are able to access. An aerial drone may then be deployed to capture video of more remote areas that can be analyzed live as the video is streamed to the edge datacenter 130. The logic rules may categorize a geographic area (flooded/passable) or identify possible survivors and generate location alerts. For example, the user may configure a logic rule to send an alert with an image of a possible survivor to the closest rescue unit in response to detection of a part of a person in the aerial video that is not associated with a known rescuer or survivor. In some implementations, as infrastructure may be damaged in a natural disaster scenario, one or more services may be moved to the edge datacenter 130 such that persistent communication with the cloud network 110 is not necessary.

Figure 3:
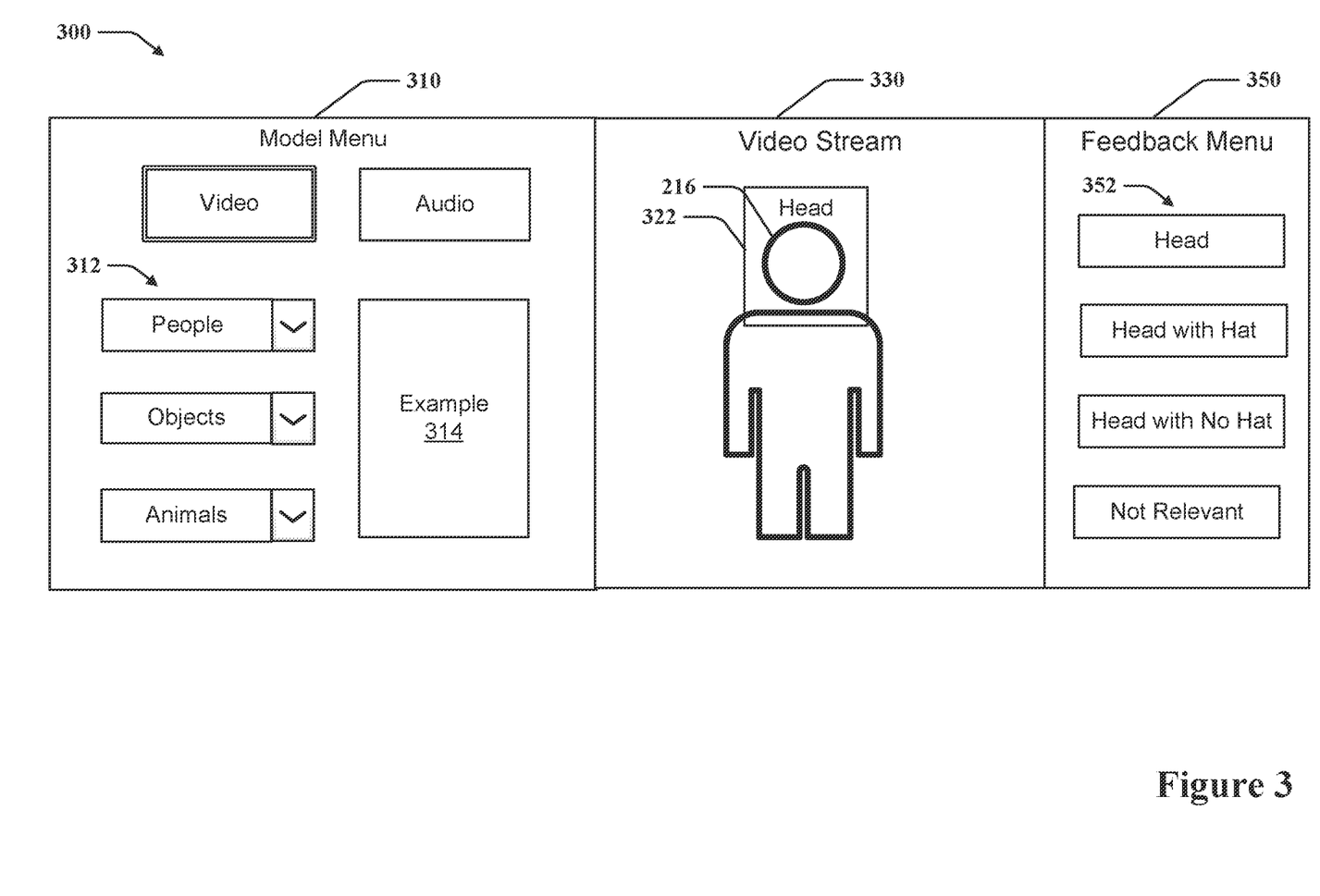
FIG. 3 is an example graphical user interface for training a model, in accordance with aspects described herein.

FIG. 3 is an example graphical user interface (GUI) 300 for training a model. The GUI 300 may include a model menu 310 for selecting template models, a stream display 330 for showing suggested elements, and a feedback menu 350 for a user to provide identification of a suggested element. For instance, the GUI 300 may be used to train a model for the construction scenario.

The model menu 310 may present a menu for selecting template models 122. For example, the model menu 310 may allow a user to select between video models and audio models. In some implementations, the selection between video models and audio models may be based on an input stream. The model menu 310 may include one or more categories 312. In some implementations, each category 312 may provide a drop down menu for selection of a sub-category or specific model. In some implementations, selection of a category may open a new menu with sub-categories and/or specific models. The model menu 310 may include an example area 314 that displays a representation of a selected model. For example, the example area may show segmented images showing identification of modeled element within the image.

The stream display 330 may display a data stream and suggested elements 322. The stream display 330 may allow a user to review the suggested generated by applying the selected template models to a training data stream. For example, as illustrated a video stream may be represented by a current image. A suggested element 216 within a video stream may be represented by bounding box 322 including a suggested label of the element. A representation of an audio stream may include an image of volume over time where suggested elements may be time segments labeled with a suggested word.

The feedback menu 350 may include buttons 352 to identify the suggested element 216. For example, the buttons 352 may include a button corresponding to the suggested label for the suggested element (e.g., "head"). The buttons 352 may include refined labels for the suggested element (e.g., "head with hat" or "head with no hat"). The buttons 352 may include a button for indicating that the suggested element is not relevant such as a misclassified object.

Figure 4:
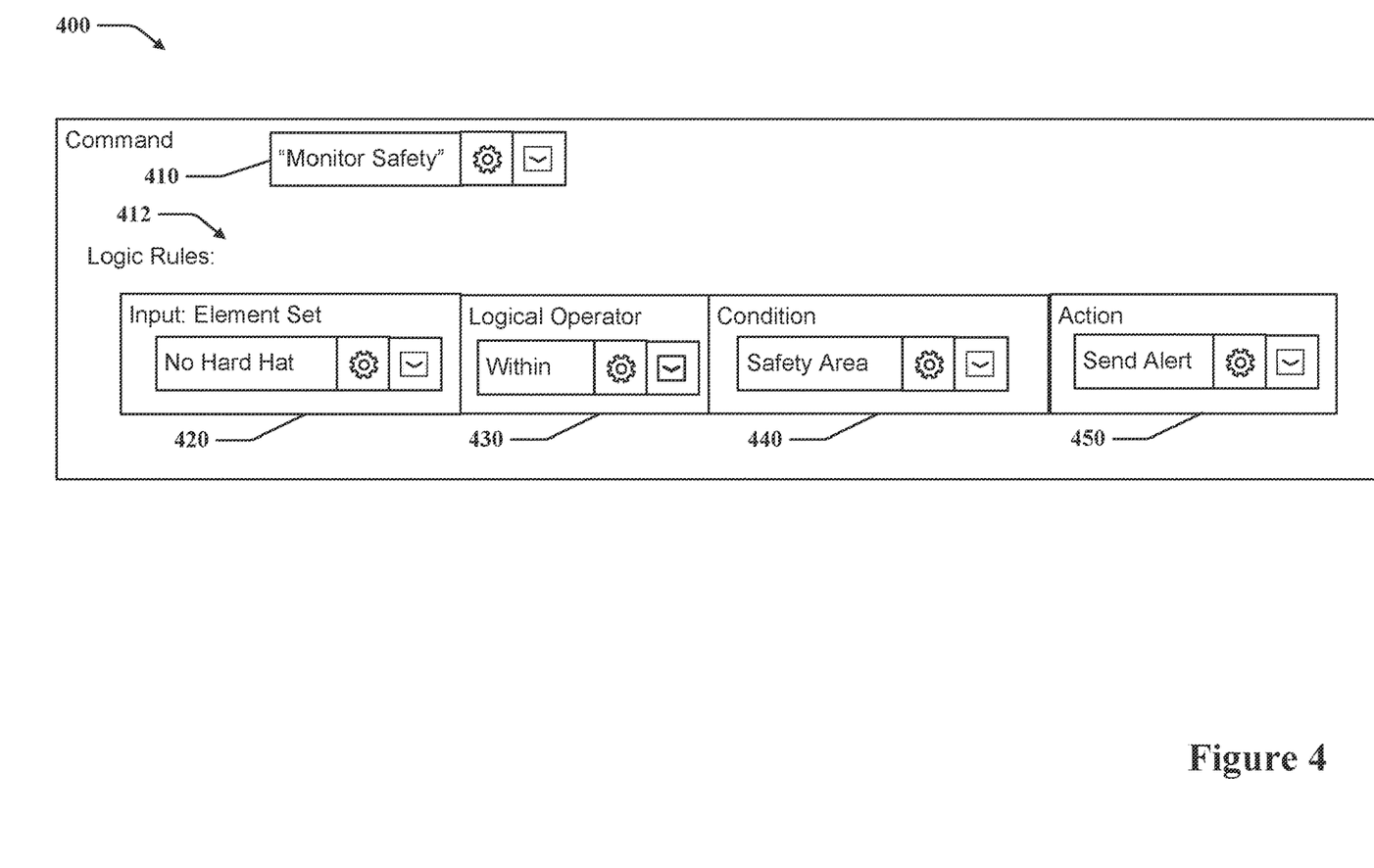
FIG. 4 is an example of a graphical user interface for configuring user-configured logic rules for a logic service, in accordance with aspects described herein.

FIG. 4 is an example of a graphical user interface 400 for configuring user-configured logic rules for a logic service 126. The graphical user interface 400 may include a command selector 410 that configures a trigger to execute one or more logic rules 412. For example, the selector 410 may be used to select a voice command with the phrase "monitor safety" to activate the logic rule 412. Alternatively, the command may be received from an application on the user device 160. In some implementations, logic rules 412 may be arranged in a workflow where an action for one logic rule is to execute another logic rule. Each logic rule 412 may include selectors for one or more of an element 420, logical operator 430, condition 440, and action 450. In the case of a machine learning analysis system, an input to the logic rule 412 may be the element set generated by interrogating a data stream, although the logic service 126 may receive other inputs. The selector for the element 420 may allow selection of specific labels for identified elements. For the construction example, the user may be interested in elements of a person with no hard hat. The logical operator 430 may allow selection of various operators and comparators such as Boolean operators or mathematical operators. The condition 440 may optionally specify a value to be used with the operator such as a threshold. For example, in the construction example, the logical operator 430 may be "within" and the condition 440 may specify a safety area. The safety area may be further configured to define a region within a video stream. The action 450 may specify an action to be taken in response to the logic rule 412. In the construction example, the action 450 may be to send an alert, which may be further configured to select content of the alert and method of sending. In some implementations, the action 450 may allow selection of action in various applications that may be associated with the logic service 126, for example, applications that expose an application programming interface (API). In some implementations, the IoT service 250 may provide an API that may be used with a variety of IoT devices. The logic service 126 may present the available API calls as options in the graphical user interface 400 such that the user may select the actions without needing to write code.

FIG. 5 is a schematic diagram of an example of a device 500 (e.g., a computing device) for providing edge services. The device 500 may be implemented as one or more computing devices in the edge datacenter 130.

In an example, the device 500 can include a plurality of processors 502 and memory devices shown collectively as memory 504. The computing resources (processors 502 and memory 504) of the device 500 may be allocated to containers 506, which may include, for example, virtual machines, process isolated containers, or kernel isolated containers. The containers may be configured to execute or store instructions or other parameters related to providing one or more applications or processes, such as, but not limited to, the interrogation service 230. For example, processor 502 and memory 504 may be separate components communicatively coupled by a bus (e.g., on a motherboard or other portion of a computing device, on an integrated circuit, such as a system on a chip (SoC), etc.), components integrated within one another (e.g., processor 502 can include the memory 504 as an on-board component), and/or the like. Memory 504 may store instructions, parameters, data structures, etc. for use/execution by processor 502 to perform functions described herein.

FIG. 6 is a schematic diagram of an example of a datacenter 112 for hosting various cloud services. The datacenter 112 may be implemented as one or more computing devices in the cloud network 110.

In an example, the datacenter 112 can include a plurality of processors 602 and memory devices shown collectively as memory 604. The computing resources (processors 602 and memory 604) of the datacenter may be allocated to containers 606, which may include, for example, virtual machines, process isolated containers, or kernel isolated containers. The containers may be configured to execute or store instructions or other parameters related to providing one or more applications or processes, such as, but not limited to, the training service 120, an internet of things (IoT) service 230, speech service 240, storage service 124, and analysis service 128. For example, processor 602 and memory 604 may be separate components communicatively coupled by a bus (e.g., on a motherboard or other portion of a computing device, on an integrated circuit, such as a system on a chip (SoC), etc.), components integrated within one another (e.g., processor 602 can include the memory 604 as an on-board component), and/or the like. Memory 604 may store instructions, parameters, data structures, etc. for use/execution by processor 602 to perform functions described herein.

Further, it should be understood that the use of containers 506 and 606 to host services may allow deployment of services at different locations or migration of services to new locations. In an aspect, some services associated with the machine learning analysis service may benefit from being closer to a sensor device 150. For instance, the interrogation service 230 may be located at the edge datacenter 130 to minimize distance that the live data data stream 232 travels, but the interrogation service 230 may be located in the cloud network 110 if low latency is less important. Conversely, the speech service 240 is illustrated as being hosted in the cloud network 110 but may benefit from lower latency if hosted at the edge datacenter 130.

FIG. 7 is a flow diagram of an example of a method 700 for egress traffic control in an OSP network. For example, the method 700 can be performed by the device 500, the datacenters 112, 130 and/or one or more components thereof to provide a machine-learning analysis system configured by a user using a low-code or no-code approach.

At block 710, the method 700 includes receiving a first data stream from a sensor device. In an example, the training service 120, e.g., in conjunction with processor 602, memory 604, and container 606, can receive the training data stream 212 from a sensor device 150.

At block 720, the method 700 includes training a machine-learning model to recognize selected elements of the first data stream that are selected from a package of template models. In an example, the training service 120 and/or the model training 220, e.g., in conjunction with processor 602, memory 604, and container 606, can train the custom model 132 to recognize selected elements of the training data stream 212 that are selected from a package of template models 122. In some implementations, the selected elements may be selected by a user via a graphical user interface 300 provided by the sensor studio 210. In some implementations, at sub-block 722, the block 720 may include applying the template models to the first data stream to generate suggested elements. For example, the model training 220 may apply the selected template models 122 to generate a suggested element 216, which may be presented to the user on the GUI 300. At sub-block 724, the block 720 may include receiving an identification of the suggested element from a user. For example, the model training 220 may receive feedback 214, which may identify the suggested element 216. For instance, the user may select a button 352 on the GUI 300 to identify the suggested element 216. At sub-block 726, the block 720 may include storing the identification of the suggested element 216 and a portion of the first data stream (e.g., one or more frames of the training data stream 212) including the suggested element 216 as training data for refining a corresponding template model 122.

At block 730, the method 700 includes deploying the machine-learning model to an edge datacenter. In an example, the storage service 124, e.g., in conjunction with processor 602, memory 604, and container 606, can deploy the custom model 132 to the edge datacenter 130.

At block 740, the method 700 includes receiving a second data stream at the edge datacenter via a network connection. In an example, the interrogation service 230, e.g., in conjunction with processor 502, memory 504, and/or container 506 can receive the live data stream 232 at the edge datacenter 130 via a network connection. For instance, the network connection may be provided by the radio network service 136.

At block 750, the method 700 includes interrogating the second data stream at the edge datacenter based on the machine-learning model to generate an element set including the selected elements. In an example, the interrogation service 230, e.g., in conjunction with processor 502, memory 504, and container 506, can interrogate the live data stream 232 at the edge datacenter 130 based on the custom model 132 to generate an element set including the selected elements. In some implementations, at sub-block 752, the block 750 may include identifying an anomaly in the second data stream. For example, the anomaly may be an element that is not expected.

At block 760, the method 700 includes receiving a selection of one or more properties of the element set and one or more logical operators to generate the user-configured logical rules. In an example, the logic service 126, e.g., in conjunction with processor 502, memory 504, and container 506, can receive a selection of one or more properties of the element set (e.g., for an element 420) and one or more logical operators 430 to generate user-configured logical rules 412.

At block 770, the method 700 optionally includes applying the user-configured logical rules to the element set. In an example, the logic service 126, e.g., in conjunction with processor 502, memory 504, and container 506, can apply the user-configured logical rules to the element set.

Figure 8:
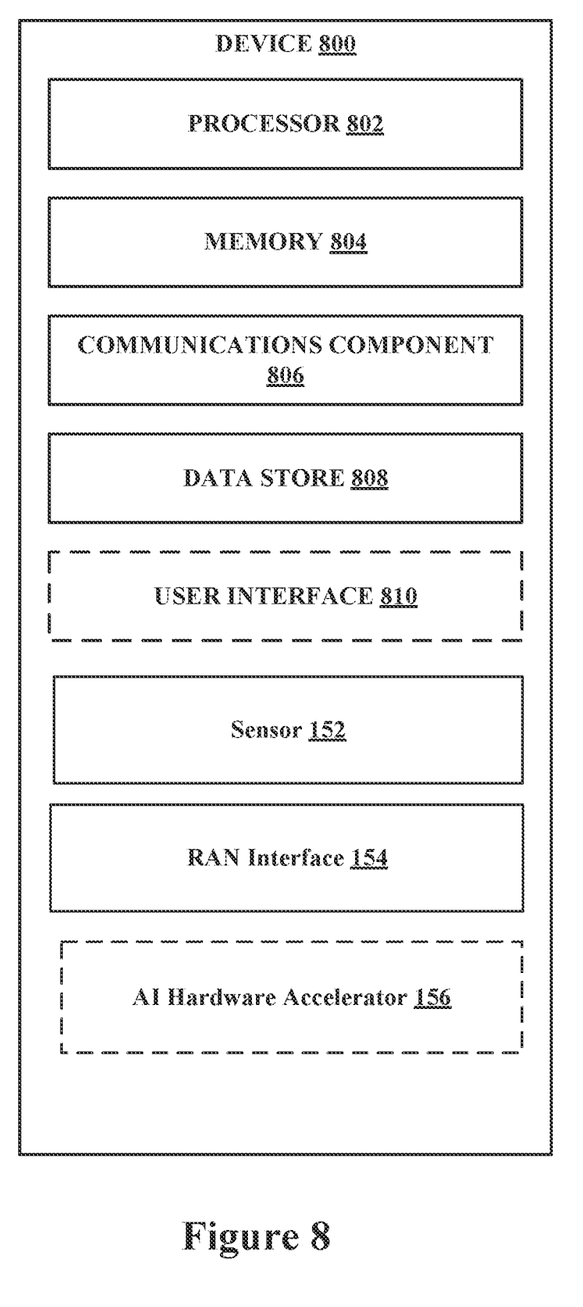
FIG. 8 illustrates an example of a sensor device including additional optional component details as those shown in FIG. 1, in accordance with aspects described herein.

FIG. 8 illustrates an example of a device 800 including additional optional component details as those shown in FIG. 1. For example, the device 800 may implement the sensor device 150 or user device 160. In one aspect, device 800 may include processor 802, which may carry out processing functions associated with one or more of components and functions described herein. Processor 802 can include a single or multiple set of processors or multi-core processors. Moreover, processor 802 can be implemented as an integrated processing system and/or a distributed processing system.

Device 800 may further include memory 804, which may be similar to memory 504 such as for storing local versions of operating systems (or components thereof) and/or applications being executed by processor 802. Memory 804 can include a type of memory usable by a computer, such as random access memory (RAM), read only memory (ROM), tapes, magnetic discs, optical discs, volatile memory, non-volatile memory, and any combination thereof.

Further, device 800 may include a communications component 806 that provides for establishing and maintaining communications with one or more other devices, parties, entities, etc. utilizing hardware, software, and services as described herein. Communications component 806 may carry communications between components on device 800, as well as between device 800 and external devices, such as devices located across a communications network and/or devices serially or locally connected to device 800. For example, communications component 806 may include one or more buses, and may further include transmit chain components and receive chain components associated with a wireless or wired transmitter and receiver, respectively, operable for interfacing with external devices.

Additionally, device 800 may include a data store 808, which can be any suitable combination of hardware and/or software, that provides for mass storage of information, databases, and programs employed in connection with aspects described herein. For example, data store 808 may be or may include a data repository for operating systems (or components thereof), applications, related parameters, etc. not currently being executed by processor 802. In addition, data store 808 may be a data repository for the sensor 152 or RAN interface 154.

Device 800 may optionally include a user interface component 810 operable to receive inputs from a user of device 800 and further operable to generate outputs for presentation to the user. User interface component 810 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof. In some implementations, the user interface component 810 may present the user interface 158, the GUI 300 or the GUI 400.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The following provides an overview of aspects of the present disclosure:

Aspect 1: A system for performing customized machine learning analysis of a data stream, comprising: a cloud service configured to: receive a first data stream from a sensor device; train a machine-learning model to recognize selected elements of the first data stream that are selected from a package of template models; and deploy the machine-learning model to an edge datacenter; and an edge datacenter configured to: receive a second data stream via a network connection; and locally interrogate the second data stream based on the machine-learning model to generate an element set including the selected elements.

Aspect 2: The system of Aspect 1, further comprising the sensor device.

Aspect 3: The system of Aspect 2, wherein the sensor device comprises: one or more sensors configured to generate the second data stream; and a radio access network interface configured to transmit the second data stream to the edge datacenter via a radio access network.

Aspect 4: The system of any of Aspects 1-3, wherein the edge datacenter is configured to host one or more of a radio access network protocol stack or cellular core protocol stack for the network connection.

Aspect 5: The system of any of Aspects 1-4, further comprising a logic service configured to: receive a selection of one or more properties of the element set and one or more logical operators via a graphical user interface to generate user-configured logical rules; and apply the user-configured logical rules to the element set.

Aspect 6: The system of Aspect 5, wherein the cloud service is configured to: receive a third data stream including user audio input; and generate commands for the logic service based on the user audio input.

Aspect 7: The system of Aspect 5, wherein the logic service is executed at the edge datacenter.

Aspect 8: The system of any of Aspects 1-7, wherein the first data stream is a video stream, and the package of template models includes at least one set of image models, wherein to train the machine-learning model, the cloud service is configured to receive a selection of the at least one set of image models via a graphical user interface including a menu of the image models.

Aspect 9: The system of any of Aspects 1-8, wherein the cloud service is configured to: apply the template models to the first data stream to generate a suggested element; receive an identification of the suggested element from a user; and store the identification of the suggested element and a portion of the first data stream including the suggested element as training data for refining a corresponding template model.

Aspect 10: The system of any of Aspects 1-9, wherein to locally interrogate the second data stream based on the machine-learning model, the edge datacenter is configured to identify an anomaly in the second data stream.

Aspect 11: A method of deploying customized machine learning analysis of a data stream, comprising: receiving a first data stream from a sensor device; training a machine-learning model to recognize selected elements of the first data stream that are selected from a package of template models via a graphical user interface; deploying the machine-learning model to an edge datacenter; receiving a second data stream at the edge datacenter via a network connection; and interrogating the second data stream at the edge datacenter based on the machine-learning model to generate an element set including the selected elements.

Aspect 12: The method of Aspect 11, further comprising: generating the second data stream at a sensor device; and transmitting the second data stream to the edge datacenter via a radio access network.

Aspect 13: The method of Aspect 11 or 12, wherein the edge datacenter is configured to host one or more of a radio access network protocol stack or cellular core protocol stack for the network connection.

Aspect 14: The method of any of Aspects 11-13, further comprising: receiving a selection of one or more properties of the element set and one or more logical operators via a graphical user interface to generate user-configured logical rules; and applying the user-configured logical rules to the element set.

Aspect 15: The method of Aspect 14, further comprising: receiving a third data stream including user audio input; and generating commands for a logic service to apply the user-configured logical rules based on the user audio input.

Aspect 16: The method of Aspect 14, wherein applying the user-configured logical rules to the element set is executed at the edge datacenter.

Aspect 17: The method of any of Aspects 11-16, wherein the first data stream is a video stream, and the package of template models includes at least one set of image models, wherein training the machine-learning model comprises receiving a selection of the at least one set of image models via the graphical user interface.

Aspect 18: The method of any of Aspects 11-17, wherein training the machine-learning model comprises: applying the template models to the first data stream to generate a suggested element; receiving an identification of the suggested element from a user; and storing the identification of the suggested element and a portion of the first data stream including the suggested element as training data for refining a corresponding template model.

Aspect 19: The method of any of Aspects 11-18, wherein interrogating the second data stream based on the machine-learning model comprises identifying an anomaly in the second data stream.

Aspect 20: A non-transitory computer-readable medium storing computer executable instructions, that when executed by a processor, cause the processor to: receive a first data stream from a sensor device; train a machine-learning model to recognize selected elements of the first data stream that are selected from a package of template models via first user interface; receive a selection of one or more properties of an element set and one or more logical operators via a graphical user interface to generate user-configured logical rules; receive a second data stream via a network connection; interrogate the second data stream based on the machine-learning model to generate the element set including the selected elements; and apply the user-configured logical rules to the element set.

Aspect 21: A non-transitory computer-readable medium storing computer executable instructions, that when executed by a processor, cause the processor to perform the method of any of Aspects 11-19.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system for performing customized machine learning analysis of a data stream, comprising:
 a cloud service executed on at least one processor of a first datacenter, the cloud service configured to:
  receive a first data stream from a sensor device;
  train a machine-learning model to recognize selected elements of the first data stream that are selected from a package of template models, wherein the first data stream is a video stream, and the package of template models includes at least one set of image models, wherein to train the machine-learning model, the cloud service is configured to receive a selection of the at least one set of image models via a graphical user interface including a menu of the image models; and
  deploy the machine-learning model to a second datacenter;
 the second datacenter including a memory configured to store the machine-learning model and at least one processor configured to:
  receive a second data stream via a network connection; and
  locally interrogate the second data stream based on the machine-learning model to generate an element set including the selected elements; and
 a logic service configured to:

receive a selection of one or more properties of the element set and one or more logical operators via a graphical user interface to generate user-configured logical rules; and apply the user-configured logical rules to the element set.

2. The system of claim 1, further comprising the sensor device.

3. The system of claim 2, wherein the sensor device comprises:

one or more sensors configured to generate the second data stream; and a radio access network interface configured to transmit the second data stream to the second datacenter via a radio access network.

4. The system of claim 1, wherein the network connection is a radio access connection between the sensor device and the second datacenter, wherein the second datacenter is an edge datacenter and is configured to host one or more of a radio access network protocol stack or a cellular core protocol stack for the radio access connection.

5. The system of claim 1, wherein the cloud service is configured to:

receive a third data stream including user audio input; and generate commands for the logic service based on the user audio input.

6. The system of claim 1, wherein the logic service is executed at the second datacenter.

7. The system of claim 1, wherein the cloud service is configured to:

apply the template models to the first data stream to generate a suggested element;

receive an identification of the suggested element from a user; and store the identification of the suggested element and a portion of the first data stream including the suggested element as training data for refining a corresponding template model.

8. The system of claim 1, wherein to locally interrogate the second data stream based on the machine-learning model, the second datacenter is configured to identify an anomaly in the second data stream.

9. A method of deploying customized machine learning analysis of a data stream, comprising:

receiving, at a first datacenter, a first data stream from a sensor device;

training a machine-learning model to recognize selected elements of the first data stream that are selected from a package of template models via a graphical user interface, wherein the first data stream is a video stream, and the package of template models includes at least one set of image models, wherein training the machine-learning model comprises receiving a selection of the at least one set of image models via a graphical user interface including a menu of the image models;

deploying the machine-learning model to a second datacenter;

receiving a second data stream at the second datacenter via a network connection; and interrogating the second data stream at the second datacenter based on the machine-learning model to generate an element set including the selected elements; and receiving a selection of one or more properties of the element set and one or more logical operators via a graphical user interface to generate user-configured logical rules; and applying the user-configured logical rules to the element set.

10. The method of claim 9, further comprising:

generating the second data stream at a sensor device; and transmitting the second data stream to the second datacenter via a radio access network.

11. The method of claim 9, wherein the network connection is a radio access connection between the sensor device and the second datacenter, wherein the second datacenter is an edge datacenter and is configured to host one or more of a radio access network protocol stack or a cellular core protocol stack for the radio access connection.

12. The method of claim 9, further comprising:

receiving a third data stream including user audio input; and generating commands for a logic service to apply the user-configured logical rules based on the user audio input.

13. The method of claim 9, wherein applying the user-configured logical rules to the element set is executed at the second datacenter.

14. The method of claim 9, wherein training the machine-learning model comprises:

applying the template models to the first data stream to generate a suggested element;

receiving an identification of the suggested element from a user; and storing the identification of the suggested element and a portion of the first data stream including the suggested element as training data for refining a corresponding template model.

15. The method of claim 9, wherein interrogating the second data stream based on the machine-learning model comprises identifying an anomaly in the second data stream.

16. A non-transitory computer-readable medium storing computer executable instructions, that when executed by a processor, cause the processor to:

receive a first data stream from a sensor device;

train a machine-learning model to recognize selected elements of the first data stream that are selected from a package of template models via first user interface, wherein the first data stream is a video stream, and the package of template models includes at least one set of image models, wherein to train the machine-learning model, the computer executable instructions include instructions to receive a selection of the at least one set of image models via a graphical user interface including a menu of the image models;

receive a selection of one or more properties of an element set and one or more logical operators via a graphical user interface to generate user-configured logical rules;

receive a second data stream via a network connection;

interrogate the second data stream based on the machine-learning model to generate the element set including the selected elements; and apply the user-configured logical rules to the element set.

17. The non-transitory computer-readable medium of claim 16, wherein the network connection is a radio access connection between the sensor device and a datacenter, wherein the datacenter is an edge datacenter and is configured to host the machine-learning model and one or more of a radio access network protocol stack or a cellular core protocol stack for the radio access connection.

* * * * *